July 16, 1968  J. L. CIRINGIONE ETAL  3,392,953
STABLE PLATFORM WITH VIBRATION ABSORBERS
Filed Dec. 28, 1966  3 Sheets-Sheet 1

INVENTORS.
JOSEPH L. CIRINGIONE
ALEX COHEN
PHILIP C. FRANCO
ARTHUR P. STEVENS
JOSEPH TRONOLONE, JR.
BY Arthur L. Bowers
AGENT
Louis B. Applebaum
ATTORNEY July 16, 1968 J. L. CIRINGIONE ET AL 3,392,953
STABLE PLATFORM WITH VIBRATION ABSORBERS
Filed Dec. 28, 1966 3 Sheets-Sheet 2

INVENTORS.
JOSEPH L. CIRINGIONE
ALEX COHEN
PHILIP C. FRANCO
ARTHUR P. STEVENS
JOSEPH TRONOLONE, JR.
BY Arthur L. Bowers
AGENT
Louis B. Applebaum
ATTORNEY

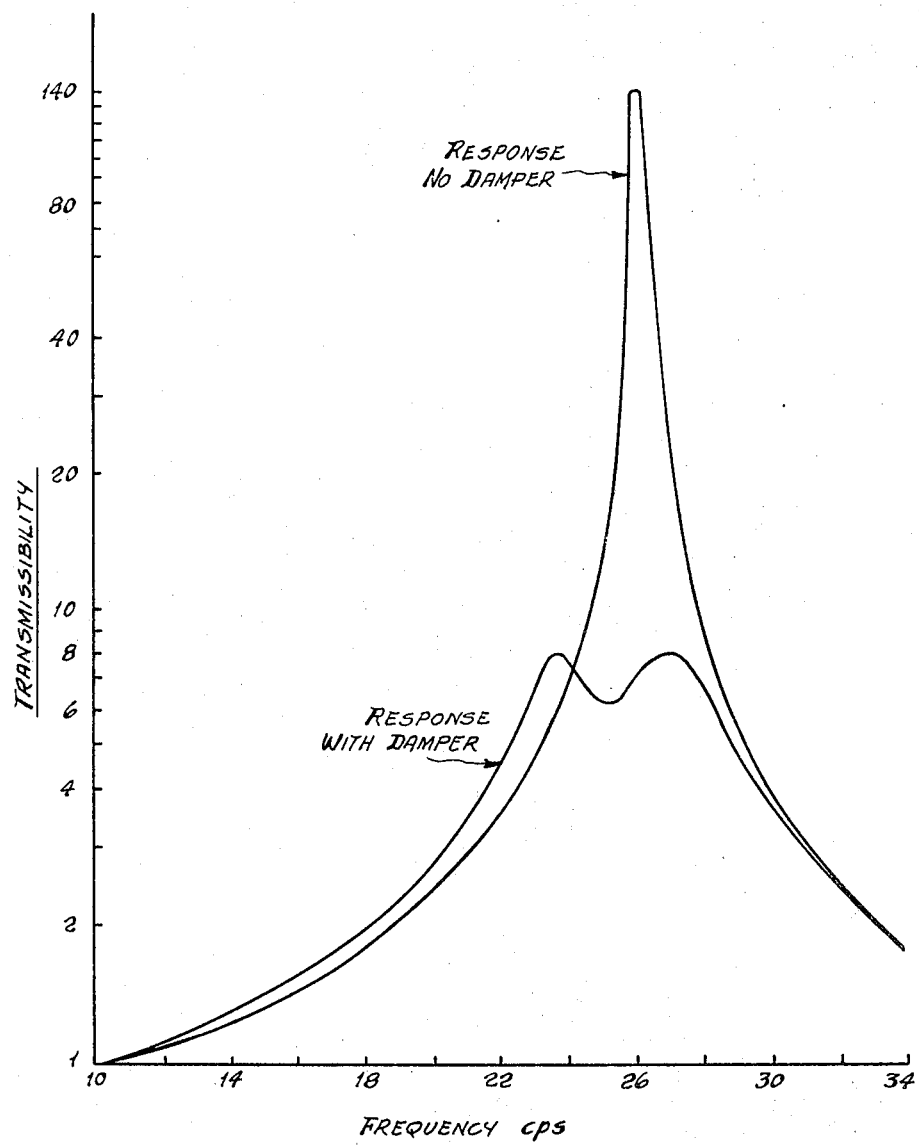

United States Patent Office 3,392,953
Patented July 16, 1968

3,392,953
STABLE PLATFORM WITH VIBRATION ABSORBERS
Joseph L. Ciringione, Bellmore, Alex Cohen, Far Rockaway, Philip C. Franco, Kew Gardens, Arthur P. Stevens, Elmhurst, and Joseph Tronolone, Jr., Cambria Heights, N.Y., assignors to the United States of America as represented by the Secretary of the Navy
Filed Dec. 28, 1966, Ser. No. 605,519
5 Claims. (Cl. 248—358)

ABSTRACT OF THE DISCLOSURE

Vibration absorbers for a pendulously supported stable platform assembly of a navigation system.

The invention described herein may be manufactured and used by or for the Government of the United States of America for governmental purposes without the payment of any royalties thereon or therefor.

Background of the invention

One type of stable platform assembly for navigation systems is pendulously supported from a rigid resilient stalk with a low damping factor and affixed to a part of the ship, near the meta-center. The ship structure transmits vibration energy to the stable platform transverse to the stalk. The vibration energies thus transmitted fall within a wide band. The stable platform and the stalk together have a natural frequency within that band. Under some operating conditions, namely, extreme maneuvers calling for sudden acceleration or deceleration, wave action in heavy seas, etc. ringing due to shock excited inputs are established in the ship's structure. Additionally, in naval vessels, shock excited inputs originate from discharge of artillery, detonation of subsurface charges, etc. Sufficient vibration energy at the resonant frequency of tht stable platform may be delivered to the stalk transverse to its length in any direction over 360 degrees and can result in large amplitude deleterious vibration excursions of the stable platform and can cause degradation of navigational performance and damage. Until now there have been no devices to neutralize or dampen the vibration of a pendulously supported navigational stable platform.

Summary of the invention

A cylindrical mass is axially supported by a spring rod and immersed in a viscous medium and contained within a light-weight container of slightly larger size. A pair of the vibration absorbers are mounted 180 degrees apart on a stable platform of a navigation system with their axis vertical for attenuating vibratory energy in the stable platform in any horizontal direction.

An object of this invention is to reduce the vibration amplification of a pendulous stalk-supported stable platform of a ship's navigation system.

A further object is to provide vibration damping means operable over 360 degrees about a given axis.

Other objects and advantages will appear from the following description of an example of the invention, and the novel features will be particularly pointed out in the appended claims.

Description of the drawings

FIG. 3 is a graphical showing of the frequency response of the stable platform undamped and damped.

Description of the preferred embodiment

Figure 1:
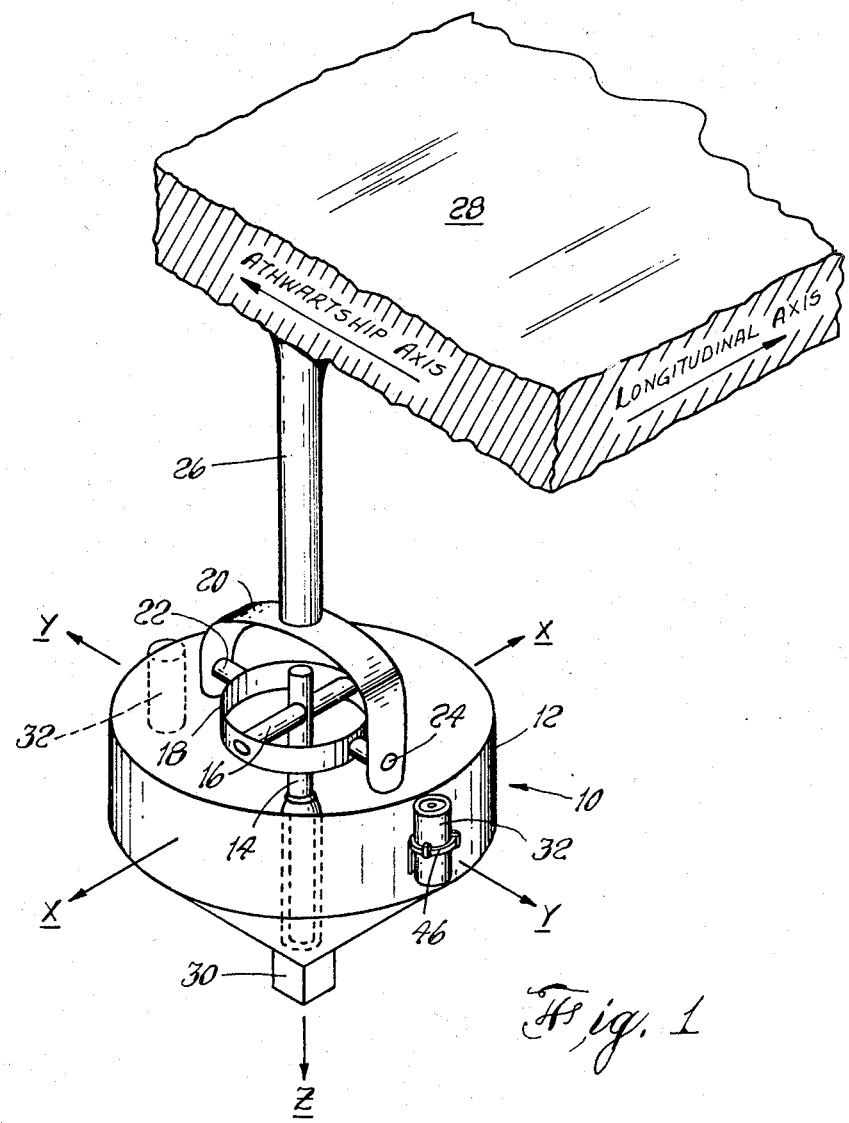
FIG. 1 is a simplified perspective view of a stable platform showing a vibration absorber.

A stable platform assembly 10 modified to include vibration absorbers 32 in accordance with the teachings of this invention is shown in FIG. 1. The mechanical and electrical details of the platform, per se, including gyroscopes, synchros, torques, accelerometers, amplifiers, electrical connections etc. does not constitute part of this invention. Basically a platform such as 10 includes a rigid cage or housing 12 having bearing means for journaling on a shaft 14 and is restrained against axial displacement relative to the shaft 14. Shaft 14 is attached to an intersecting transverse shaft 16 that is journaled at its ends in a gimbal 18. The gimbal is journaled to a yoke 20 by means of aligned shafts 22 and 24 having an axis coplanar with and perpendicular to the axis of shaft 16. The yoke 20 is rigidly secured to a rigid, resilient pendant stalk 26 secured at its upper end to a heavy bedplate 28 which in turn is secured to the framework of a ship. The stable platform is located as close to the metacenter of the ship as is practical to minimize pitch and roll. The axis of shaft 16 is parallel to the longitudinal axis of the ship and the axis of the shafts 22, 24 is parallel to the athwartship axis of the ship. The housing is gyro stabilized against rotation about a vertical axis and against angular displacement of the journal axis of the housing 12 relative to the vertical about the axis of the shaft 16 or X axis and about the axis of shafts 22, 24 or Y axis. A stable platform assembly as shown in FIG. 1 also conventionally includes angular displacement measuring means such as synchro devices for generating a signal indicative of the angular relationship of the housing 12 and shaft 14, the angular relationship of shaft 14 and the axis of gimbal 18, and the angular relationship of the plane defined by shaft 16 and shafts 22 and 24 to the axis of shafts 22 and 24. Torquers, not shown, conventionally carried by the assembly are responsive to information from computers or other equipments to correct errors in the orientation of the platform due to shaft friction, etc., and to continuously set the Z axis of the stable platform as the ship changes location on the earth so as to be in line with a radius from the center of the earth. Mirrors 30 at the bottom of the housing 12 are for use in checking the platform accuracy optically during tests. A pair of cylindrical damped dynamic vibration absorbers 32 embodying the principles of this invention are secured to the exterior of housing 12 in diametrically opposed relationship and with the axes of the vibration absorbers 32 and the axis or center mass of the stable platform coplanar.

Figure 2:
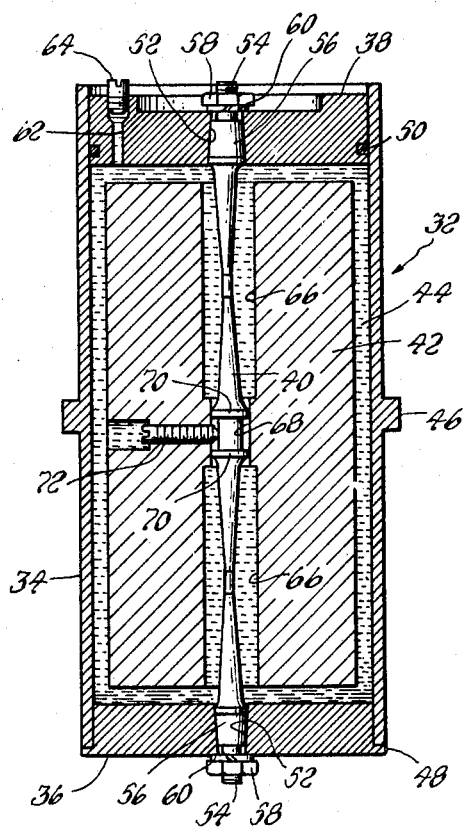
FIG. 2 is a view partly in section and partly in elevation, on an enlarged scale, of a vibration absorber in accordance with this invention.

Vibration absorber 32 illustrated in FIG. 2 includes a housing cylinder 34, circular end pieces 36 and 38 nested in the ends of the housing cylinder 34 and a spring rod 40 secured to the end pieces. The housing cylinder 34, end pieces 36 and 38, and spring rod 40 are preferably of a low density metal e.g., aluminum and together they define an hermetically sealed container. A cylindrical damper mass 42 of a dense metal, e.g. tungsten, is secured at its center to the center of the spring rod 40. A liquid 44, e.g. silicone oil of suitable viscosity for damping effectiveness occupies all of the volume within the housing cylinder and end pieces not occupied by the spring rod and cylindrical damper mass. The cylindrical damper mass and the housing cylinder joined by the spring rod can be relatively vibrated radially in any direction.

The housing cylinder is formed with a flange 46 for engagement by a clamp. End piece 36 is formed with a lip 48 larger than the inside diameter of the cylinder to seat against the end of the cylinder and is cemented in place. End piece 38 is provided with an O-ring seal 50. The end pieces 36 and 38 have an axial straight tapered hole 52. The spring rod has straight threaded ends 54.

Inwardly of the threaded ends the rod has tapered sections 56 shorter than the lengths of the tapered holes 52 in the end pieces. When the spring rod 40, the end pieces 36 and 38 and nuts 58 and lock washers 60 are assembled with the housing cylinder 12, the tapered holes in the end pieces are hermetically sealed. The end piece 38 has a hole 62 sealed by a conventional removable fitting 64 in piece 16 to bleed out air and excess liquid during assembly.

The spring rod extends through two coaxial holes 66 that extend from opposite ends of the damper mass joined at the center of the damper mass by a coaxial short-length hole 68 of small diameter reamed for a tight fit with the spring rod. The coaxial holes 66 are of sufficient diameter to afford adequate clearance for the spring rod during vibration. The spring rod has its largest diameter at two ring-like portions 70 near its center that fit tightly in the small diameter center hole 68. Between the ring-like portions the spring rod is engaged by two set screws 72 that are threadedly assembled radially in the damper mass. To more uniformly distribute vibratory stress along the length of the spring rod, and for maximum efficiency as to moment-area relationship, the rod is tapered as shown.

To assemble the vibration absorber, first the end piece 36 is affixed to the cylinder housing. The spring rod is assembled in the damper mass and locked by means of the set screws. Then the subassembly of spring rod and damper mass is inserted in the cylinder housing and the end of the spring rod is threaded into the tapered hole 52 and secured with nut and lockwasher. Then with the open-end uppermost, the cylinder housing is filled almost fully with the liquid. Then the end piece minus fitting 64 is threaded over the other end of the spring rod. The end piece 38 is forced inwardly. First air and then excess liquid is bled out through the hole 62. After the end piece is forced inwardly to where the tapered hole in the end piece is sealed by the tapered portion 56 of the spring rod and secured with nut and lockwasher, the seal 64 is threaded into the bleed hole. The tuning of the vibration absorber can be changed by selection of a spring rod of another length and other diametrical dimensions and by selection of another damper mass. The difference between the inside diameter of the cylinder housing and the outside diameter of the weight is designed to provide clearance for a predetermined maximum amplitude of vibration in the vibration absorber.

Aboard ship, horizontal vibration is imparted by the bedplate to combination of stalk and stable platform assembly. Without the vibration absorber, when the imparted vibration is the same as the natural frequency of the stable platform assembly and supporting stalk, the amplitude of vibration at the stable platform is far greater than at the bed plate. The vibration frequency response shown in FIG. 3 of the stalk and stable platform assembly is obtained by use of a shaker table. The spring rod and damper mass are designed to have a natural frequency that is substantially the same as that of the natural frequency of stalk and stable platform. The weight of the absorber mass is selected to be as low as practical. A very successful embodiment of the invention has a damper mass whose weight is 0.05 that of the stable platform assembly.

When vibration imparted to the stable platform equipped with vibration absorbers according to this invention approaches the natural frequency of both the stable platform and the vibration absorbers, the absorber masses are displaced relative to their respective housings oppositely to the vibratory direction of the stable platform counteracting the motion of the platform. The liquid filling the space between the damper mass and the cylinder housing attenuates the vibration due to the shearing action on the liquid.

In an application of this invention, magnification of vibration transmitted by the bed plate to the stable platform was reduced from 140 to 8. Each of the two vibration absorbers provides one-half the required damping capacity without adversely affecting angular rigidity, balance, and performance of the stable platform. The elongate configuration of the vibration absorber has the advantage of requiring less space than a squat vibration absorber made in accordance with this invention and having the same performance characteristics. The stable platform assembly generally is located in a confined space barely more than adequate for the pendulous motion of the stable platform.

To practice the invention, the frequency characteristics of the stable platform and stalk is determined by use of a shaker table. A response curve of a stable platform derived by use of the shaker table is shown in FIG. 3.

A vibration absorber as shown in FIG. 2 may be designed for a particular situation by use of the relationship:

$$TR = \frac{x_o}{x_{st}} = \left[ \frac{(\alpha^2-\beta^2)^2+(2\delta\alpha\beta)^2}{[(\alpha^2-\beta^2)(1-\beta^2)-\alpha^2\beta^2\mu]^2+(2\delta\alpha\beta)^2(1-\beta^2-\beta^2\mu)^2} \right]^{1/2}$$

$TR$ = transmissibility $\frac{x_o}{x_{st}}$ = amplitude magnification = vibratory deflection/static deflection $\alpha = \frac{\omega\alpha}{\omega_o}$ = natural frequency ratio of absorber and main system $\beta = \frac{\omega}{\omega_o}$ = forced frequency ratio $\mu = \frac{m}{M}$ = mass ratio = absorber mass/main mass $\delta = \% \ C/Cc$ = percent of critical damping The response of a system with a damped vibration absorber as described depends on the mass ratio $\mu$ that is selected. Increasing the mass ratio reduces the optimum attainable transmissibility. The mass ratio influences the value of optimum or the natural frequency ratio and also the value of optimum percent of critical damping. It is desirable to select the maximum allowable mass factor consistent with reasonably low possibility of affecting the proper balance and operation of the stable platform.

The preceding equation can be used for deriving predicted response curves of transmissibility v. frequency of the platform undamped or damped and damper mass and parametric curves of tuning and damping values to illustrate sensitivities.

Two vibration absorbers 180° apart are used in this invention rather than one vibration absorber to minimize space requirements and to maintain balance. More than two vibration absorbers can introduce balance problems. Each vibration absorber provides one-half the damping force needed for limiting vibration amplitude of the stable platform at resonance. The stable platform is operable to maintain a constant orientation regardless of direction of the vessel on which installed and the vibration absorbers are omnidirectionally effective in the horizontal plane.

The stable platform with the vibration absorbers has two degrees of freedom. The damped stable platform has two resonances as shown in FIG. 3, one at a lower frequency and one at a higher frequency than the resonance frequency of the undamped stable platform. The shearing action of the damper liquid attenuates the vibration energy.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:
1. A vibration absorber comprising:
   a cylindrical damper mass of a dense metal, spring means supporting said damper means for vibratory displacement in any direction transverse to the axis of the damper mass, a thin-wall cylindrical housing of a low density metal containing said damper mass and spring means, end pieces affixed to said spring means and in opposite ends of said housing and together defining an hermetically sealed chamber and locating said damper mass centrally and coaxially in said housing, and damping liquid filling the space within the housing between the housing and the damper mass.

2. A vibration absorber as defined in claim 1, where said damper mass has an axial hole end to end, and said spring means is a resilient rod and extends through the axial hole and is joined to the damper mass centrally of both, the axial hole in said damper mass being of larger diameter than the resilient rod between the joinder of the damper mass and the resilient rod and the ends of the damper mass.

3. A vibration absorber comprising:

a cylindrical damper mass of a dense metal, spring means supporting said damper mass for vibratory displacement in any direction transverse to the axis of the damper mass, and a cylindrical housing containing said damper mass and spring means in a liquid environment.

4. A vibration absorber as defined in claim 3, wherein said damper mass is coaxial with said housing and central of the housing, said housing having sufficiently larger diameter than said damper mass to provide clearance for relative vibratory movement between housing and damper mass in any direction transverse to the axis of the damper mass.

5. In combination with a stable platform assembly and stalk for pendulously securing the stable platform assembly to a ship, the improvement which comprises:

a pair of vibration absorbers secured to opposite sides of said stable platform, each vibration absorber including:

a cylindrical thin-walled housing of low density metal, a cylindrical absorber mass of a high density metal having a smaller diameter than the inside diameter of the housing, said absorber mass having an axial hole and having a constricted diameter portion at the center, a resilient rod extending through the axial hole in the absorber mass, the center of the resilient rod joined to the absorber mass at the constricted portion of the absorber mass, end pieces in opposite ends of said housing and affixed to opposite ends of said resilient rod, said housing, end pieces, and resilient rod defining an hermetically sealed container, and vibration absorber liquid occupying the space within said housing and end pieces not occupied by the damper mass and resilient rod.

References Cited

UNITED STATES PATENTS

| | | | |
|---|---|---|---|
| 2,582,998 | 1/1952 | Lee | 248—358 |
| 3,075,619 | 1/1963 | McCandliss | 248—358 XR |
| 3,107,752 | 10/1963 | McLean | 248—358 XR |
| 3,348,796 | 10/1967 | Baratoff et al. | 248—20 |

JOHN PETO, *Primary Examiner.*